Sept. 25, 1945.  O. STETTLER  2,385,657
ELECTRICAL REMOTE CONTROL
Filed Sept. 3, 1942  8 Sheets-Sheet 1
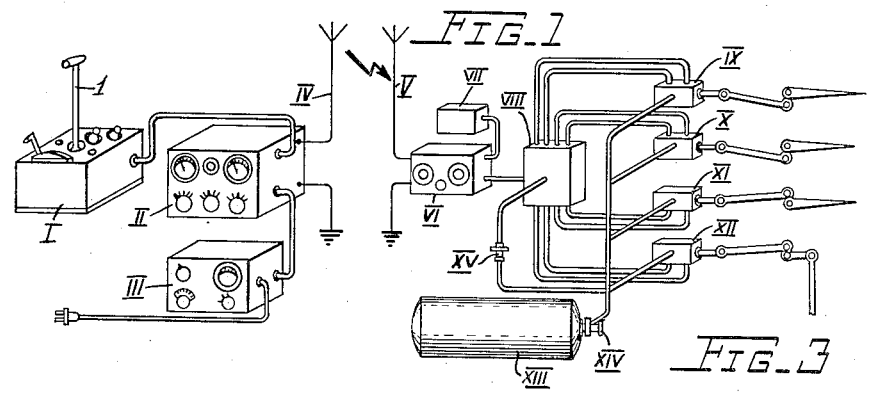
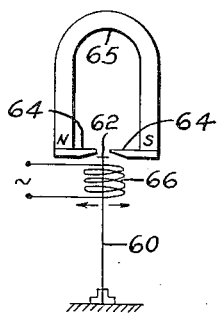
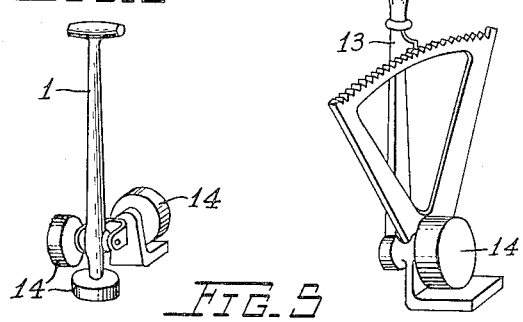
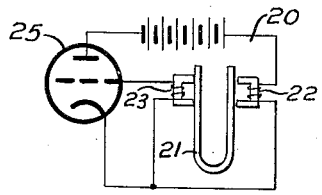
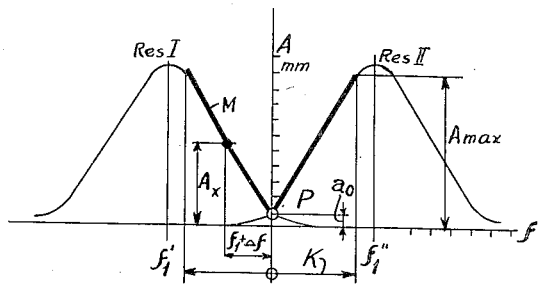
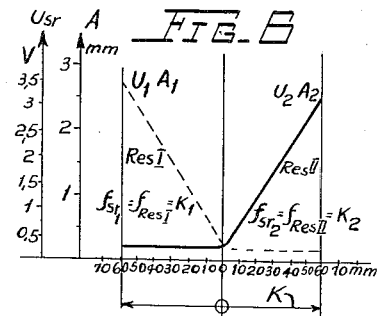
Inventor:
OSKAR STETTLER
By Singer, Ehlert, Stern & Carlberg
Attorneys
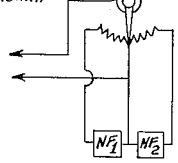

Sept. 25, 1945.  O. STETTLER  2,385,657
ELECTRICAL REMOTE CONTROL
Filed Sept. 3, 1942  8 Sheets-Sheet 2
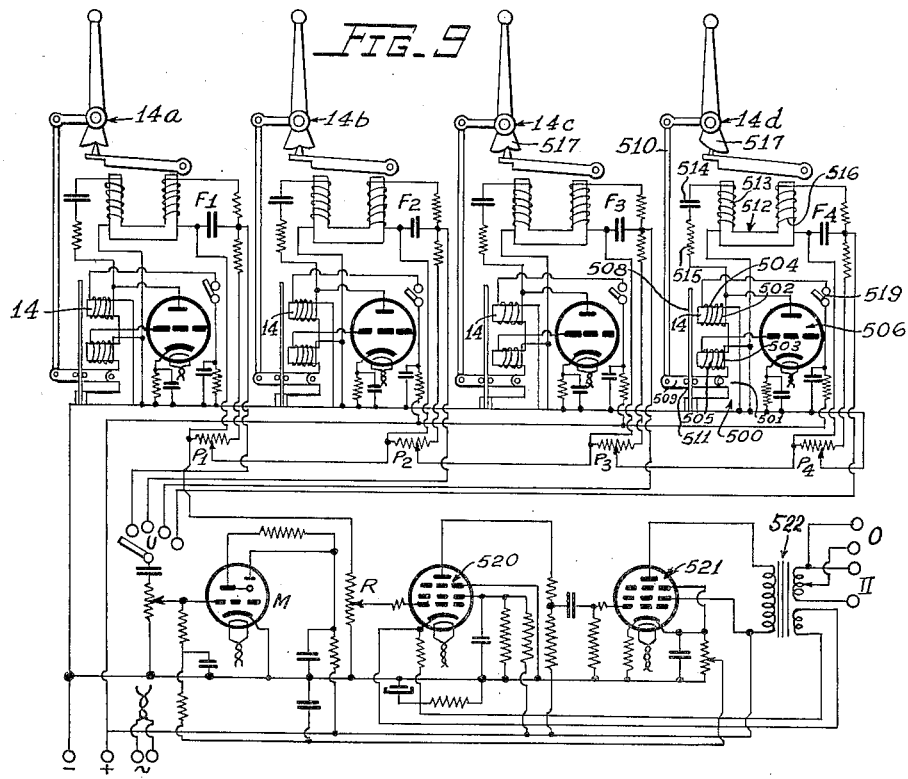
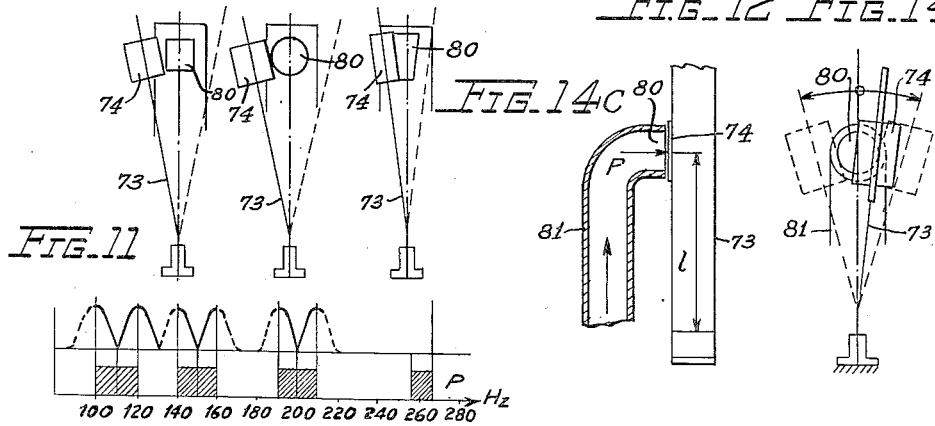
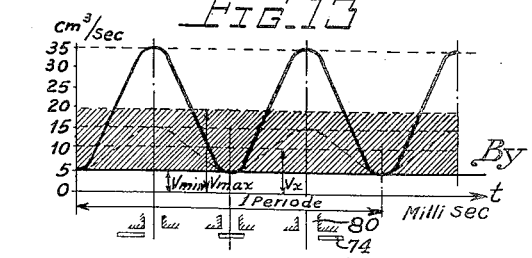
Inventor
OSKAR STETTLER
By Singer, Ehlert, Stern & Carlberg
Attorneys Sept. 25, 1945.   O. STETTLER   2,385,657
ELECTRICAL REMOTE CONTROL
Filed Sept. 3, 1942   8 Sheets-Sheet 3
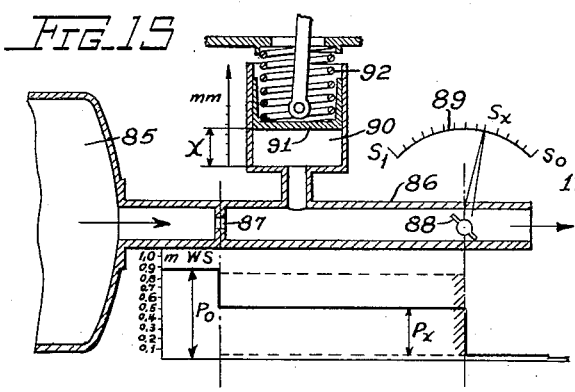
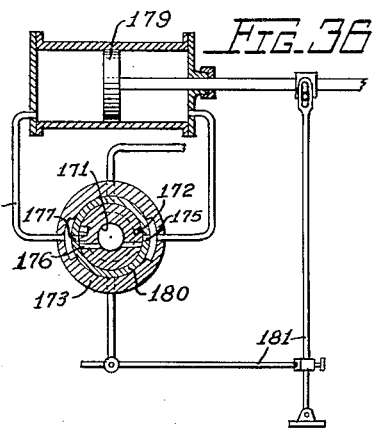
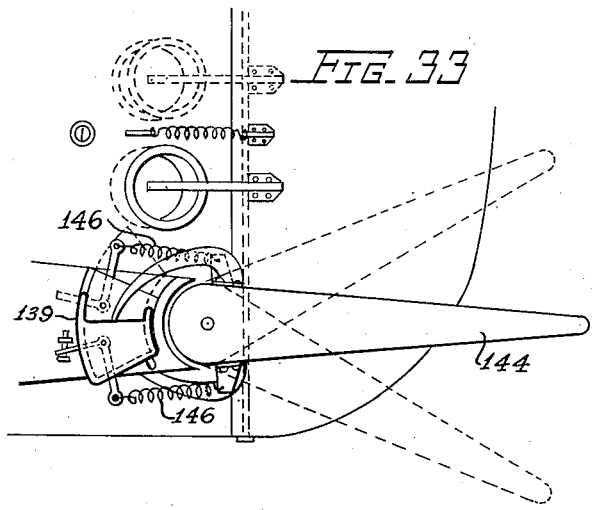
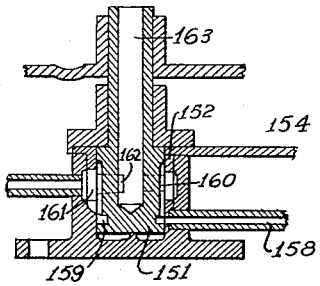
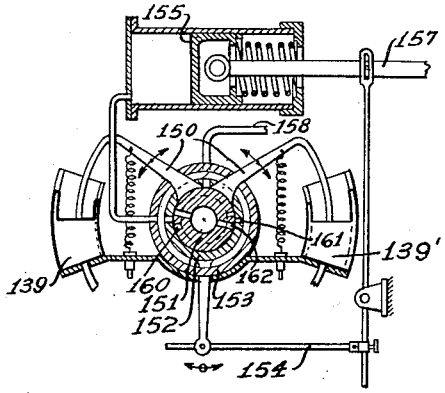
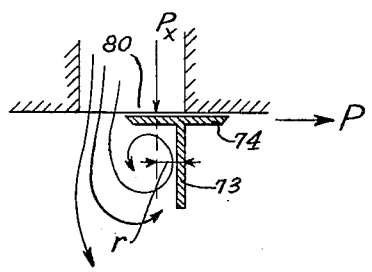
Inventor:
OSKAR STETTLER
By Singer, Ehlert, Stern & Carlberg
Attorneys Sept. 25, 1945. O. STETTLER 2,385,657
ELECTRICAL REMOTE CONTROL
Filed Sept. 3, 1942 8 Sheets-Sheet 4
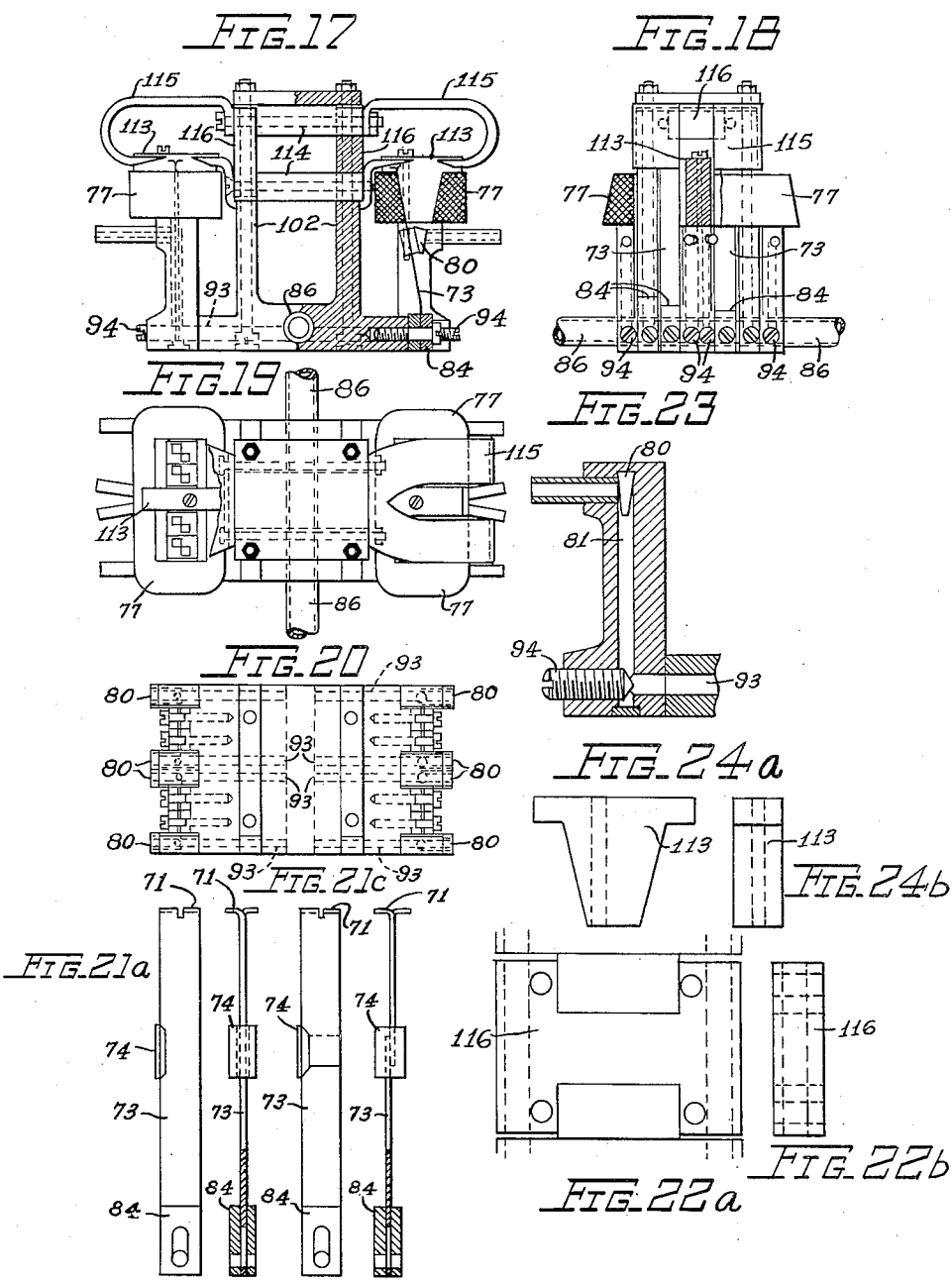
Inventor:
OSKAR STETTLER
By Singer, Ehlert, Stern & Carlberg
Attorneys Sept. 25, 1945. O. STETTLER 2,385,657
ELECTRICAL REMOTE CONTROL
Filed Sept. 3, 1942 8 Sheets-Sheet 5
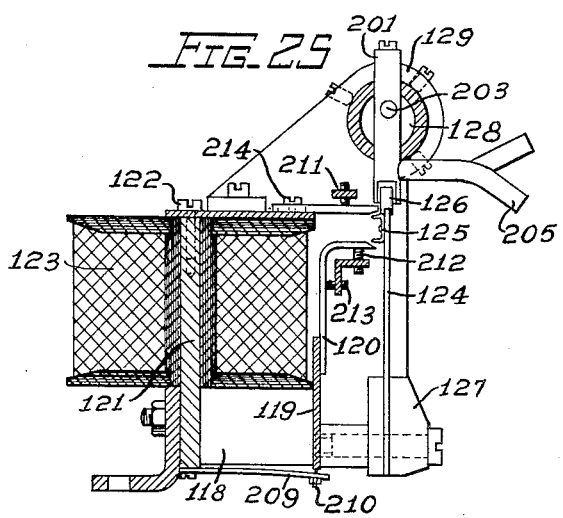
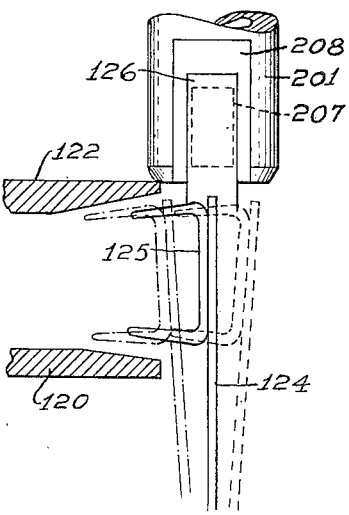
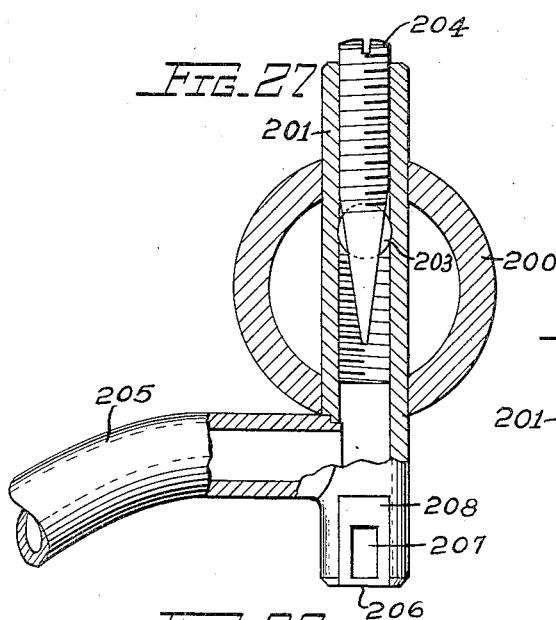
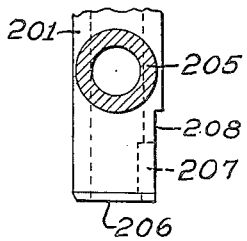
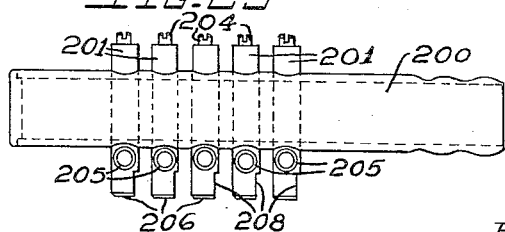
Inventor:
OSKAR STETTLER
By Singer, Ehlert, Stern & Carlberg
Attorneys

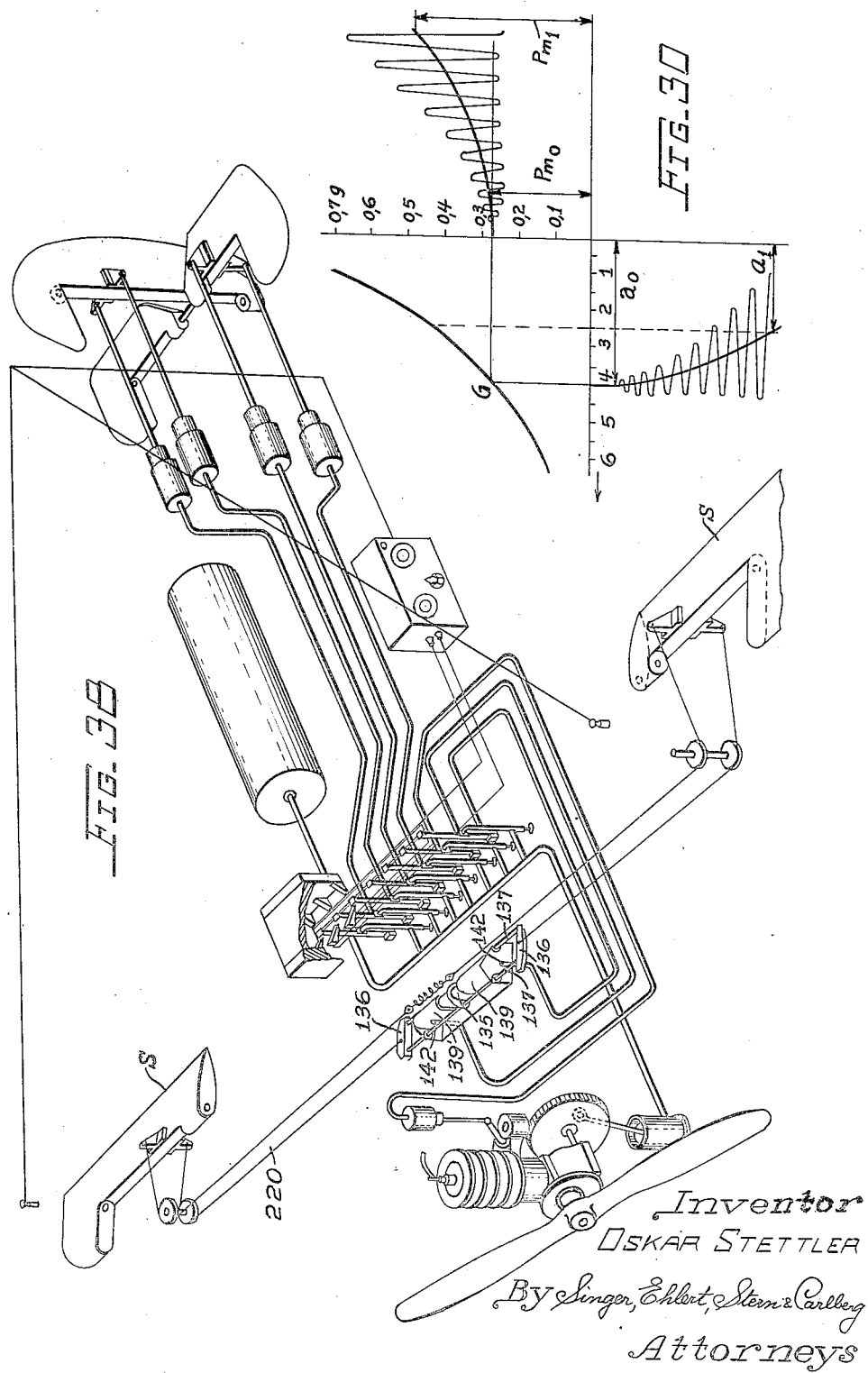

Sept. 25, 1945.  O. STETTLER  2,385,657
ELECTRICAL REMOTE CONTROL
Filed Sept. 3, 1942  8 Sheets-Sheet 7
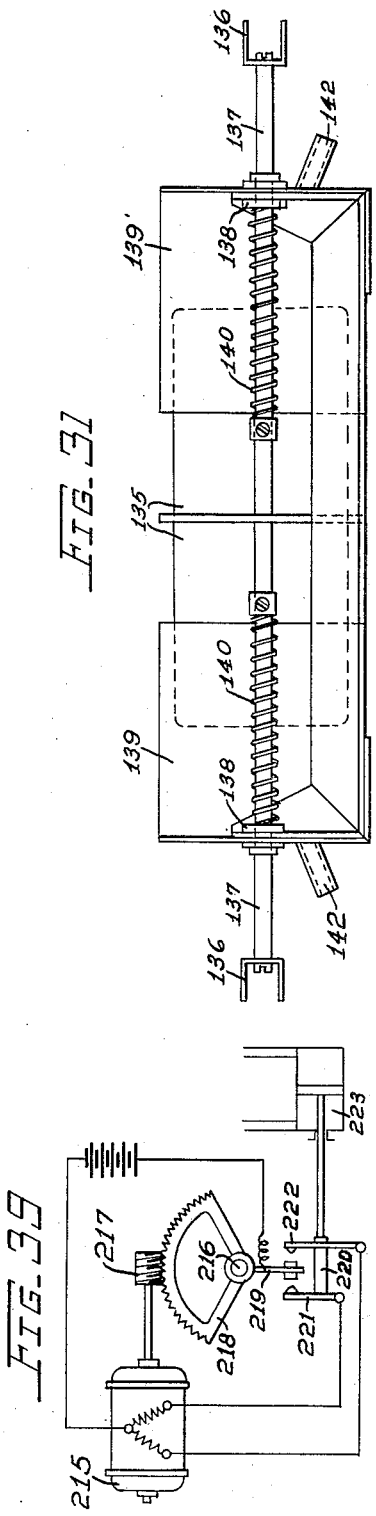
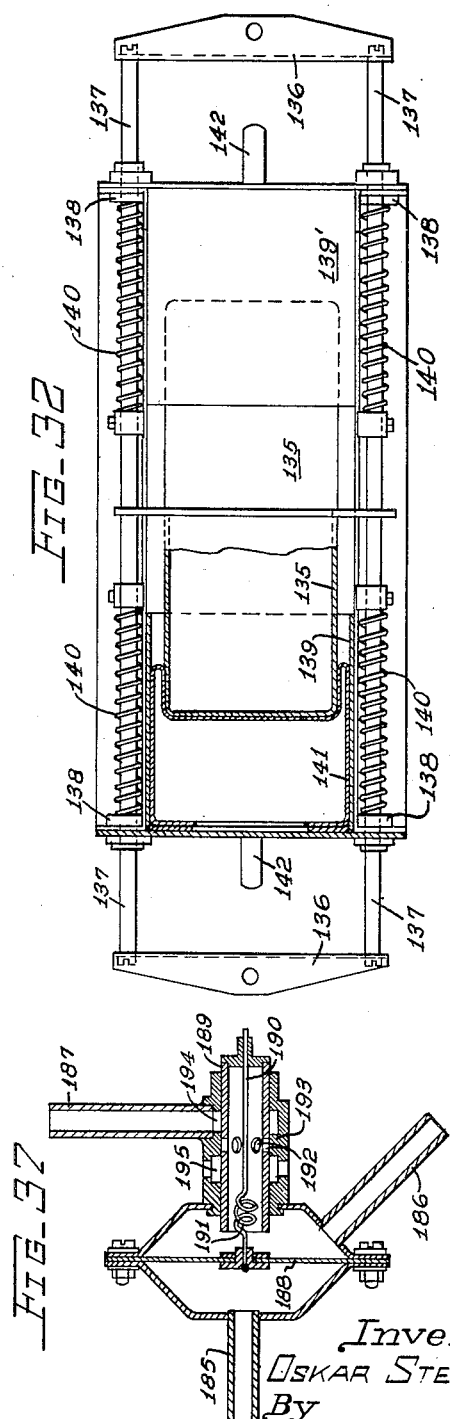
Inventor:
OSKAR STETTLER
By
Singer, Ehlert, Stern & Carlberg
Attorneys Sept. 25, 1945.   O. STETTLER   2,385,657
ELECTRICAL REMOTE CONTROL
Filed Sept. 3, 1942   8 Sheets-Sheet 8
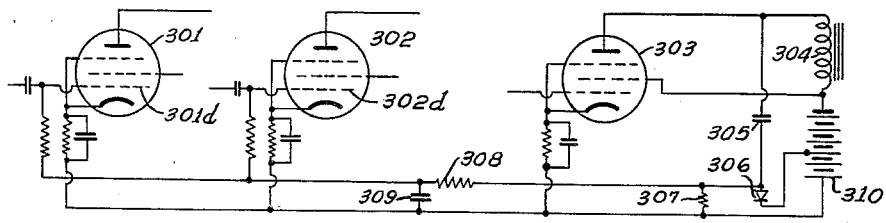
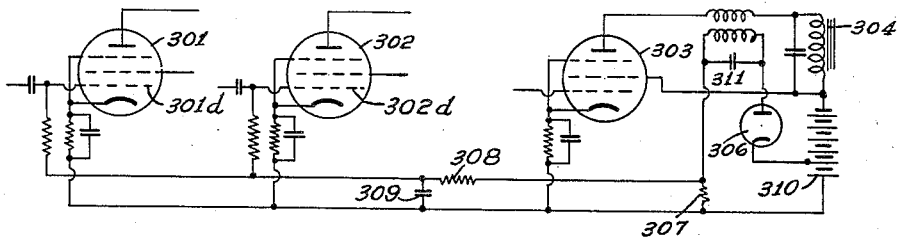
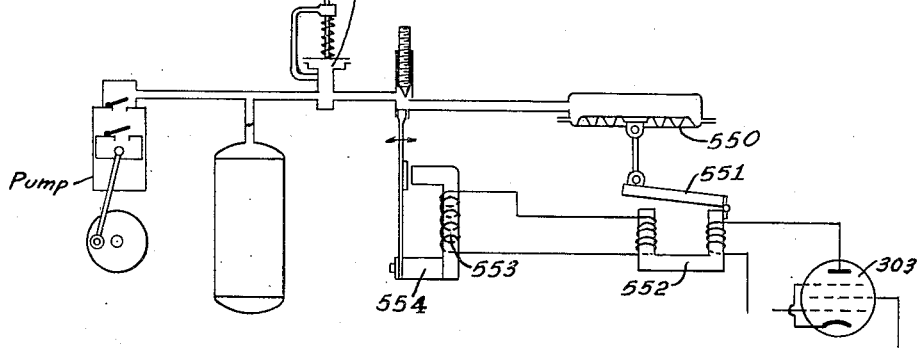
Inventor:
OSKAR STETTLER
By Singer, Ehlert, Stern & Carlberg
Attorneys Patented Sept. 25, 1945

2,385,657

UNITED STATES PATENT OFFICE 2,385,657

ELECTRICAL REMOTE CONTROL

Oskar Stettler, Zurich, Switzerland, assignor to Philips Lampen A.-G., Zurich, Switzerland, a corporation of Switzerland Application September 3, 1942, Serial No. 457,241
In Switzerland May 17, 1941

18 Claims. (Cl. 177—353)

This invention relates to remote control apparatus including a tele-controlled object provided with control members which are adjustable in accordance with control signals received from a transmitter.

The object of the invention is to enable the controlling movement of a plurality of arbitrarily actuated control members of a transmitter to be simultaneously transmitted, sensitively and continuously (not stepwise) from a transmitter to the corresponding control members of the tele-controlled object with substantially complete synchronism of the controlling and controlled members, and to do this with devices and sources of power which do not take up much room, do not weigh much, and are very unresponsive to disturbing influences According to the present invention the control members of the tele-controlled object are actuated by bodies of air, the pressure of which is continuously variable under the action of regulating members forming part of electro-pneumatic relay means tuned to respond to control signals comprising variations in the frequency or/and amplitude of a number of alternating currents each of which is allotted to one of the said control members, whereby the control members can be adjusted continuously in accordance with the adjustment of continuously variable control members of the transmitter.

The invention will now be described with reference to the accompanying drawings, in which:

Fig. 1 is a diagrammatic representation of an apparatus according to the invention for the remote control of an aerial vehicle.

Fig. 2 shows a joystick for actuating three control members of the transmitter.

Fig. 3 shows a different form of a manually actuated means for actuating the control members of the transmitter.

Fig. 4 is a circuit diagram of a tuning fork oscillator forming part of the electro-pneumatic relay means.

Fig. 5 and Fig. 6 are diagrams showing the mutual relationship of the resonance curves of a frequency controlled electro-pneumatic relay and of an amplitude controlled relay, respectively.

Figs. 7 and 8 are diagrammatic representations of two different forms of regulating means for varying the voltage as a function of the position of the control member of the transmitter.

Fig. 9 is a circuit diagram of a transmitter apparatus for controlling four movements.

Fig. 10 is a diagrammatic view showing the actuation of a resonator by means of a polarized relay.

Fig. 11 is a diagram showing the curves of the control frequencies for three symmetrical movements and one non-symmetrical control movement.

Fig. 12 is a diagrammatic representation of a resonator associated with a slide valve and pressure nozzle forming part of the electro-pneumatic relay means.

Fig. 13 is a diagram showing the air outflow volume from the nozzle as a function of the amplitude of the resonator and of the time.

Figs. 14a, 14b and 14c show resonators associated with nozzles of different shapes.

Fig. 15 is a diagrammatic view showing the manner in which the electro-pneumatic relay means actuates a control member of the tele-controlled object.

Fig. 16 is a diagrammatic view showing the conditions of flow of the air when the slide valve is attached to the side of the resonator.

Figs. 17 to 19 show, respectively, a side elevation partly in section, an end elevation, also partly in section, and a top plan view of a constructional form of electro-pneumatic relay.

Fig. 20 is a top plan view of the relay corresponding to Fig. 19 with certain of the parts removed.

Figs. 21a and 21b show two views at right angles to one another on a larger scale of one form of resonator.

Figs. 21c and 21d show two views at right angles to one another on a larger scale of another form of resonator.

Figs. 22a and 22b show two elevations at right angles to one another on a larger scale of a detail of the upper part of the electro-pneumatic relay shown in Fig. 19.

Fig. 23 is a vertical section of a detail of the lower part of the electro-pneumatic relay shown in Fig. 19, also on a larger scale, and Figs. 24a and 24b show two elevations at right angles to one another on a larger scale of a further detail of the electro-pneumatic relay shown in Fig. 19.

Fig. 25 is a side elevation partly in vertical section of a modified form of electro-pneumatic relay.

Fig. 26 shows on a larger scale a side elevation partly in section of a detail of the relay shown in Fig. 25.

Fig. 27 shows on a larger scale a side elevation partly in section of another detail of the relay shown in Fig. 25, and Fig. 28 is an end elevation partly in section of the lower portion of the detail shown in Fig. 27;

Fig. 29 is a side elevation of a nozzle block for five air nozzles.

Fig. 30 is a diagram illustrating the dependence of the pressure behind the control slide valve as a function of the amplitude of the displacement of the slide valve.

Figs. 31 and 32 are a side elevation and plan, respectively of a working cylinder for actuating a control member of the tele-controlled object.

Fig. 33 shows an arrangement of working cylinders for the direct actuation of aircraft flight control members.

Fig. 34 is a vertical section through a servo-motor for controlling a single-acting working cylinder.

Fig. 35 is a horizontal section of a detail of the servo-motor shown in Fig. 34.

Fig. 36 shows diagrammatically in section the general arrangement of a servo-motor for a double-acting working cylinder.

Fig. 37 shows a differential pressure servo-motor in longitudinal section.

Fig. 38 is a diagrammatic representation in perspective of an apparatus installed on board an aerial vehicle for the wireless control thereof.

Fig. 39 shows diagrammatically an electrically operated servo-motor with pneumatically operated means for regulating the signal strength.

Figs. 40 and 41 are circuit diagrams of an electrically operated signal strength control device, and Fig. 42 is a diagram of the electrical connections of a pneumatically operated signal strength control device.

The plant, diagrammatically illustrated in Figure 1, is adapted for example to flying objects, such as aerial torpedoes, bombs, model aeroplanes, reconnaissance photographic aircraft without pilot, unmanned aircraft for training pilots, for projectiles and so forth. It comprises the following parts:

A. *Transmitter side.*—A control set I, a transmitter II, a feeding set III, a transmitting aerial IV.

B. *Receiver side.*—A receiving aerial V, a receiver VI, batteries VII, an electro-pneumatic resonance relay (E. P. R. relay) VIII, positioning devices with servo-control for the flight control members, i. e. the rudder, ailerons, elevators and so forth IX, X, XI, XII, a reservoir of compressed air XIII, a high-pressure reducing valve XIV, and a low-pressure reducing valve XV.

A. *Transmitter side*—(1) *Low-frequency generator.*—Every movement executed with the joy-stick 1 or with some other control member 13, Fig. 3, acts upon a low-frequency generator 14, Figs. 2 and 3, pertaining to this movement. The control member 13 acts on a single low frequency generator 14, while the joy-stick is adapted to act on three generators 14, is movable in all directions and is provided with adjustable end stops (not shown) for limiting the extent of the control movements. To each position of the control member 13 there corresponds a definite frequency or a definite output voltage of the associated low-frequency generator 14, while to each position of the joystick there corresponds a definite frequency or definite output voltage of each of the associated low frequency generators.

In order that the transmission of the individual control operations may be mutually quite independent, the ranges of frequency of the individual low-frequency generators 14 are when possible so selected that their fundamental frequencies and the harmonics thereof do not overlap in any of the possible relative positions of the control members 1, 13.

Figure 11 shows upon the lower abscissa the ranges of frequencies of the low frequency generators on the basis of the frequency control on the principle of the half resonance curve, and on the upper abscissa the resonance curves of the resonators in the electro-pneumatic resonance relay, as an example. Such a low-frequency generator 14 may for example be constructed on the principle of a tuning fork buzzer 20, Figure 4. Upon a tuning fork 21 there acts on the one hand an electro-magnet 22 in the anode circuit, and on the other hand an electro-magnet 23 in the grid circuit. After the tuning fork 21 is excited, the same is kept in vibration by a supply of vibration energy from the thermionic valve 25. The frequency is determined by the intrinsic frequency of the tuning fork 21.

For the present purpose, instead of the tuning fork 21 a blade spring clamped at one end is employed, as shown in Fig. 9 the frequency of which is varied by shifting the point of clamping.

For the construction of low-frequency generators, any other known connections and designs may also be employed.

(2) *Action of the control in the case of frequency-regulation.*—Assuming a system with reciprocal variation of frequency away from a mid position for a control movement with symmetrical working cylinders, the electro-pneumatic resonance relay hereinafter described in detail has two resonators per control movement, of which the natural frequencies are $f_1'$, $f_1''$ (Figure 5). The distribution of the control frequencies is represented by way of example in Figure 11 for three symmetrical and one asymmetrical control movement. The natural frequencies of the pair of resonators are so selected with respect to one another that the resonance curves thereof touch one another or overlap slightly at their adjacent base points. The blade spring 401 in the associated low-frequency generator 14 passes over a range of frequencies lying between the outermost positions of the control movement in question, that is, between $f_1'$ and $f_1''$.

In the zero position of the control member the frequency $f_1$ is generated and neither of the resonators respond. Every frequency of the low-frequency generator adjusted by the joy-stick, for instance $f_1 + \Delta f$ corresponds to a definite amplitude of the resonator between zero and $A_{max}$, for instance $A_x$. The resonator II reacts to all frequencies $f_1 + \Delta f$ within the limits $f_1$ and $f_1'$, corresponding to a stroke of the control member from the zero position in the opposite direction.

(3) *Action of the control in amplitude-regulation.*—Besides the method of control frequency regulation for the adjusting of the amplitude of the resonator in the electro-pneumatic resonance relay, a variation of the initial or output voltage of the low-frequency generator associated with the resonator may be effected. This regulating is carried out in such a way that the initial or output voltage in the zero position of the control member is a minimum, and in both the end positions is a maximum; whereas with the frequency-regulation described, the two resonators of the receiver of a symmetrical control movement are supplied by only one tone-generator at the transmitter, with amplitude regulation there is allocated to each resonator of the receiver a low-frequency generator tuned to the natural frequency of said resonator in thereof, on the transmitter. The frequencies of a pair of resonators in this latter system are not related to one another. In selecting the frequencies, however, care is to be taken that harmonics and sub-harmonics are mutually avoided. The curve of the initial or output voltage of a symmetrical control movement as a function of the transmitter position K is represented by the curves $U_1$ and $U_2$ in Figure 6. In this figure the symmetrical deflection of the control member out of a zero position is indicated on the abscissa by K. $U_1$, dotted, is the curve of initial or output alternating voltage of the generator I as a function of the travel of the control member, and $U_2$ is the same curve for the generator II.

On the ordinate the scales for the control voltage are indicated in volts and for the resonator amplitude in millimetres. Since the course of the curves for control voltage and for resonator amplitudes, in the range utilised, are in conformity, the two curves bear the corresponding double references.

The amplitude-regulator may for instance be constructed as a potentiometer with center tap and a symmetrical distribution of resistance, as illustrated in Figure 7. Alternatively it may for example consist of two variable flux transformers having separate primary and secondary windings and cooperating with a slidable iron core, as illustrated in Figure 8. The frequency of the control signals as well as the amplitude may be varied by the control members of the transmitter, for instance by mechanically coupling the amplitude regulating means to the frequency controlling members.

(4) *Mixer with low-frequency amplifier.*—The mixer combines the alternating voltages of variable frequency and amplitude furnished by the low-frequency generators of the individual control movements into a single alternating voltage, by electrical addition. In Figure 9 is shown an arrangement for combined frequency and amplitude control for three symmetrical control movements with double cylinder (for instance: elevator, rudder, aileron) and one simple control movement (for instance: gas-regulation of the engine). The apparatus consists of four low-frequency generators 14, with appliances mounted thereon for controlling the initial or output voltage, a superposer for levelling the individual control signals, consisting of the potentiometers $P_1$, $P_2$, $P_3$, $P_4$, the filters $F_1$, $F_2$, $F_3$ and $F_4$ for suppressing higher harmonics, and the low-frequency amplifier.

In the following, the details of the assembly for the control elements of one of these generators 14 is described with reference to the right hand assembly of elements in Fig. 9. The latter shows four of these control assemblies indicated by the manipulating levers 14a, 14b, 14c and 14d and the associated parts.

Each of the generators 14 comprises a frequency determining element 500 consisting of an E-shaped magnetic core 501 the arms 502 and 503 of which are provided with magnetic windings 504 and 505, respectively. Windings 504 and 505 are connected in electrical feed-back arrangement with a discharge tube 506. The frequency of the oscillations generated by the discharge tube 506 is controlled by the resonant frequency of a vibrating blade spring 508; the electrical action of the above-noted combination of elements in generating an electrical oscillating being similar to the action of the tuning fork buzzer shown in Fig. 4. The frequency of the oscillations of the generator 14 is adjustable by varying the vibratory period of the blade spring 508 and this is effected by varying the effective length of the blade spring. As shown in Fig. 9, the effective length of the blade spring 508 is varied by means of a pivoted control member 509 which is coupled to a mechanical link 510 and varies the position of a fulcrumed clamping bar 511 along the length of the blade spring 508.

The output circuit of the generator comprises a transformer 512 having a U-shaped core and the primary winding 513 of which is connected to the anode-cathode circuit of discharge tube 506 through a condenser 514 and a resistor 515. The secondary windings 516 of the transformer 12 are connected in series through the adjustable potentiometer $P_4$. In this manner, the oscillations from all of the generators are superposed through the potentiometers $P_1$, $P_2$, $P_3$, $P_4$ and individually the amplitudes of the oscillations generated are adjusted. The filters $F_1$, $F_2$, $F_3$ and $F_4$ are interposed between the secondary windings 516 of the transformer and the potentiometers for suppressing higher harmonics of the oscillations generated.

For varying the amplitude of each of the oscillations while simultaneously varying the frequency thereof, each of the control elements 509 is provided with a cam element 517 which varies the position of a fulcrumed magnetic shunt 518 positioned over the open yoke of the U-shaped core of transformer 512. By varying the position of the magnetic shunt, the coupling between primary winding 513 and secondary winding 516 is varied and the amplitude of the voltage obtained from the secondary winding 516 is correspondingly varied.

The generators 14 having the control assemblies 14a, 14b, and 14c respectively are adapted for symmetrical control movements effected by means of servomotors with double cylinders, and for this purpose the cams 517 thereof have a discontinuous symmetrical face, whereby, for instance, at the neutral position of the control lever of control assembly 14a, the output voltage of the respective generator 14 is a minimum. Control assembly 14d is adapted for a simple control movement and for this purpose the cam 517 thereof is provided with a continuous surface to thereby provide a continuous variation of the amplitude of the output voltage throughout the frequency range of the generator. A switch 519 is provided in the anode circuit of each of the discharge tubes 506 for disconnecting the supply voltage when desired.

The output voltage derived from the potentiometers $P_1$ to $P_4$ is coupled to an amplifier comprising discharge tubes 520 and 521 and an output transformer 522. The circuit arrangement of the amplifier conforms to usual practice and a further description thereof is believed to be unnecessary. A regulator R consisting of a potentiometer connected to the input electrode of discharge tube 520 serves for adjusting the output voltage of the amplifier.

For checking the operation of each of the generators 14, there is provided a vacuum tube or electronic voltmeter M, the input electrode of which may be selectively coupled to the secondary winding of each of the transformers 512 by a change-over switch U. In parallel with the output terminals, to which the communicating cable to the transmitter is connected, is provided a pair of terminals O for the addition of a cathode-ray oscillograph. By the aid of this it is possible, in case of need, to examine the mixture of frequencies.

B. *Receiver side*—(1) *Receiving apparatus.*— The receiving apparatus of the remote steering means consists essentially of the following parts:

(a) Receiving aerial,
(b) Receiver, with sources of current,
(c) Electro-pneumatic resonance relay,
(d) Pneumatic driving means for the direct actuation of the rudders and other members to be controlled,
(e) Compressed-air storage vessel with reducing valve, or air-pump with compressed-air equalising storage vessel,
(f) Servo-motors if required, for operations calling for greater control forces.

With direct transmission of the frequency mixture from the transmitter by means of a wire connection, the items a and b are omitted.

(2) *The electro-pneumatic resonance relay.*— Since a plurality of control operations are to be transmitted simultaneously by the methods described through a single path, the control current furnished by the receiver VI consists of a mixture of a plurality of alternating control currents, varying independently of one another in frequency or in amplitude or in both. To resolve this mixture into its components the action of resonance is employed, that of the mechanical resonance being adopted on practical grounds. In the relay are mounted a number of resonators, in the form of blade springs clamped at one end, 60 in Figure 10 or 73 in Figures 12, 14, 14a, 14b, 14c and 17 to 21, 20 and 21a, 21b, 21c, 21d. These resonators are so arranged in one or two rows that they are polarised by a common system of permanent magnets or electro-magnets, and can be excited by means of magnet coils traversed by the controlling alternating current. If these springs are of different lengths or of different masses, their natural frequencies of vibration differ from one another, in accordance with known laws of mechanics. In order to reduce to a minimum the initial increment time during which the amplitude of swing rises to its working value and the subsequent decrement time during which the amplitude falls to zero, the lengths and masses of the springs 60 are as small as practical considerations permit. With a given exciter output the amplitude of the resonator is approximately inversely proportional to the frequency, so that for the purpose of obtaining great amplitudes, frequencies that are as low as possible should be selected. The restoring forces (the stiffness of the springs) are so selected that the resonance points lie within a range of frequency of from 50 to 200 Hertz (cycles) for example.

Upon the springs 60, 73 there act electro-magnetic forces, which are taken from the mixture of alternating currents mentioned. For the conversion of the output of the electrical exciter into mechanical vibration energy there may for instance be utilised a method adapted in the construction of polarised relays, as illustrated in Figure 10. The blade spring 60 carries at its upper end a soft iron armature 62, the end piece of which can swing in front of the pole shoes 64 of the permanent magnet 65. When the coil 66 is traversed by an alternating current the polarity of the armature 62 located between the N and S poles varies with the frequency of the alternating current. The armature is set in vibration. If the frequency of the exciter current is not in tune with the natural frequency of vibration of the armature 62, comparatively strong currents are required in order to obtain a movement. If however the exciter frequency synchronises with the natural frequency of the spring 60, very small power outputs are sufficient to set the spring in vibration with great amplitude.

If the frequency of the exciter current is varied, while the power output is kept constant, in such a way that it passes through the natural frequency of the resonator, there arises, between the amplitude of the resonator and the frequency of the exciter, a relationship which is represented in the resonance curve M of Figure 5. In the regions of frequency considerably outside the resonance position the amplitude of vibration is very small, and gradually dies away. As the exciter frequency approaches the natural frequency the amplitude rises, as indicated by the curve M of Figure 5, and reaches a maximum when the exciter frequency synchronises with the natural frequency. If the frequency changes further in the same direction, the amplitude falls off, as indicated by the curve M.

The steepness of the rise, and the ratio between maximum and minimum amplitude, depend upon the damping of the spring 60, amongst other things. Since for the present purpose on the one hand a good efficiency (high sensitiveness of the relay) is aimed at, but on the other hand, for regulating purposes, the amplitude of vibration may be utilised as a function of the frequency, a compromise must be arrived at in choosing the steepness of the resonance curve M. A certain residual damping is also required, with a view to keeping the times required for the vibrations to cease sufficiently short.

When the frequency-regulating method is adopted, in order to obtain unambiguous values for the amplitude of the resonator vibration as a function of the exciter frequency within the range of the branch of the resonance curve of Figure 5 that is utilised, an attempt is made to obtain as large a range as possible of frequency regulation between zero and full deflection.

This aim might be attained in a simple manner by increasing the damping of the resonator, only in that case a correspondingly higher exciter output would be necessary in order to obtain a given maximum amplitude. This would unpleasantly reduce the sensitiveness of response of the relay arrangement.

By the aid of the appropriate measures in design however, it is possible to obtain a wide range of frequency-regulation without impairing the sensitiveness by additional damping.

One means of making the natural frequency of the resonator dependent upon its amplitude consists in varying the initial mechanical stress (or deflection) by the aid of a magnetic force, acting on one side and varying as a function of the amplitude.

If the resonators comprise blade springs 124 having U-shaped armatures 125 which dip into an air gap between poles 120, 122 forming part of an electro-magnetic system as illustrated in Figures 25 and 26 for instance, which is excited by a coil 123 the magnetic attracting force P of the pole shoes 120 and 122 upon the armature 125 varies as a function of the vibration in a manner such as that represented in Figure 30. It has here been presumed that the magneto-motive force of the system is constant. As is known, the magnetic attracting force P of a system consisting of a pole shoe and an armature is inversely proportional to the square of their distance between the armature and the respective pole shoes $a$. Upon the ordinate is marked the magnetic attracting force in grammes, and upon the abscissa the distance between the armature and the pole shoes. The point G (Fig. 30) denotes the position of static equilibrium between the restoring force of the stationary spring and the magnetic attraction. The initial mechanical stress produced in the spring affects the natural frequency of vibration at small amplitudes.

By providing a variable magnetic shunt circuit comprising a soft iron plate 209, Figure 25, the magnetic initial stress of all the springs can be simultaneously regulated within certain limits. The plate 209 is screwed to the yoke 121. It is mechanically initially stressed in such a way that it has a tendency to press with its other end against a clamping bar 119. Part of the flux of the permanent bar magnet 118 is thereby short-circuited. By means of a screw 210 the plate 209 can within certain limits be bent away from the bearing surface of the clamping bar 119. This arrangement permits a fine regulation, without play, of the magnetic shunt circuit.

For the adjustment of the air gaps, and therefore of the magnetic initial stresses of the individual resonators, set screws 211, 212 and 213 are employed, and also a screw 214, with which the pole shoe 122, in which there is a slot, can be shifted.

(3) *Pressure-regulation by means of the electro-pneumatic resonance relay.*—By the aid of the electro-pneumatic resonance relay the control signals received, analysed through the medium of the electro-magnetic excitation of mechanical resonators into their components, are delivered in proper proportions, and converted into fluctuations of pressure of a pneumatic power-transmission system.

By the resonators contained in the electro-pneumatic resonance relay, air-paths in a low-pressure pneumatic system are according to the invention opened and closed, without mechanical frictional losses occurring. A resonator may consist for instance of a blade spring 73, as shown in Figures 12, 14a, 14b, 14c, 16 to 20 and 21a, 21b, 21c, 21d, which has below its free vibrating end a light soft iron armature 71, shown more particularly in Figs. 21a, 21b, 21c and 21d. On the resonator is mounted a small plate 74, ground plane, which stands out at right angles to the plane of the blade spring, as shown in Figs. 21a, 21b, 21c and 21d. This small plate may alternatively be mounted, as shown in Figure 26 at 126, at the freely vibrating end of the resonator, thereby avoiding the formation of harmful eddies as shown in Fig. 16, which illustrates the air flow past the plate 74 when the resonator is vibrating. The plate 74 is located opposite to the orifice 80 of an air conduit 81 (Figs. 12 and 14), in which a raised or sub-atmospheric pressure prevails. The plate 74 or 126 is somewhat larger than the orifice 80. Between the plate 74 or 126 which constitutes a slide valve controlling the flow of air through the orifice, and the orifice 80 is an air gap, which is made as small as possible. When the spring 73 is not vibrating, the plate 74 completely covers the orifice 80. Hence only a little air can escape from the orifice. When the resonator is vibrating, the orifice is wholly or partially uncovered by the plate 74 twice per period, the effective area of the orifice which is uncovered by the plate increasing as the amplitude of vibration of the resonator increases. The arrangement, however, may be such that the orifice is fully uncovered when the resonator is stationary, the slide valve having a central opening of sufficient size for this purpose, and having a plate element on either side of the said central opening, each of which is adapted to cover the orifice 80 completely.

If it be assumed, for the purpose of simplifying the exposition, that the quantity of air issuing at a constant difference of pressure is proportional to the cross-sectional area of the orifice, and also that the cross-section of the orifice is rectangular and the edge of the slide valve straight, the quantity of air issuing through the orifice varies as a function of the time, as represented diagrammatically by Figure 13. The associated positions of the plate 74 are shown below the axis of the abscissae. By suitably shaping the orifice 80 on the one hand and the edge of the plate 74 on the other hand, the function between the deflection of the spring 73 and the escape of air, integrated over a relatively long interval of time, can be varied between fairly wide limits. Lack of proportionality between the displacement of the control member on the transmitter and the amplitude of vibration of the spring 73 in the electro-pneumatic resonance relay can be corrected for example, in such a way that proportional ratios are obtained between the stroke of the control member and the escape of air from the orifice 80. Figures 14a, 14b and 14c show three different forms of outlet orifice. By accurate calculation or by exact experimental determination of the resonance curve, for a resonator as shown for instance in Figures 12, 14a, 14b, 14c, 17 to 20 and 21a, 21b, 21c, 21d, it is found that the curve of resonance does not, as has so far been assumed for the purpose of simplifying the exposition, meet the abscissa at a definitely ascertainable point, but merges asymptotically into the abscissa, after passing a small percentage below the amplitude at resonance, over a relatively lengthy range adjacent to the resonance position.

With pure amplitude control this point is taken into account by spacing the frequencies of a pair of resonators far enough apart.

With frequency control the resonance positions of a pair of springs or reeds 73 are so selected that portions of the resonance curves, intersect one another, Fig. 5 and they do this in such a way that from the common foot point P an approximately linear rise of amplitude occurs in both directions. For the purpose of diminishing the air-consumption of the electro-pneumatic resonance relay, the slide valve 74 may be made wider than the orifice by the amount $2 \times a_0$ (Figure 5). In this case the escape of air begins at an accurately definable point, namely at the point P, where the amplitude out of resonance exceeds the value $a_0$, and in the further course, up to the value $A_{max}$, is approximately proportional to the change of frequency.

To obviate the formation of eddy currents, the little plate may be arranged overhung as a continuation of the spring, and may vibrate freely in a slot in a continuous tube.

A further problem for the electro-pneumatic resonance relay consists in the utilisation of the variable magnitude of the escape of air for the production of proportional pressure fluctuations in the working cylinders or in the control cylinders of a servo-motor. For this purpose the working cylinders are connected with the source of compressed air through nozzles that can be regulated.

A compressed-air reservoir 85, Figure 15, containing air at the pressure P₀, is connected with a pipe 86, in which an adjustable nozzle 87 is provided. This serves for regulating the apparatus. In the pipe 86 let there be assumed to be a throttle valve 88, the position of which can be read off on a scale 89. The position of the pointer is to correspond to the amplitude of the resonator. To the pipe 86 is connected a working cylinder 90, with a piston 91. The latter is pressed towards its initial position by a spring 92. The position occupied by the piston 91 at any particular time corresponds to a position of equilibrium between the spring pressure (or, it may be, the supplementary control pressure) on the one hand and on the other hand on the pressure of the body of air contained in the cylinder 90 and the pipe which acts upon the piston 91; that is to say, to each working pressure of the said body of air there corresponds a definite position of the piston between its two end positions.

$$X = f(P) = f(S)$$

In the above equation X indicates the distance the piston 91 has been displaced at a pressure $f(P)$ in the cylinder 90, which pressure is equal to the counter pressure $f(S)$ exerted by the spring 92 on the opposite side of the piston 91.

The two end positions will first be more fully explained. Let it be assumed that the exciter frequency of the control current lies outside the resonance frequency of the spring 73 (Fig. 16). The electro-magnetic impulses can only excite the spring 73 very feebly. The plate 74 is at rest in front of the orifice 80. The amount of air escaping is therefore a minimum, which corresponds to the cross-sectional area of the gap. Let the nozzle 87 be so adjusted that its cross-sectional area is for instance about three times as great as the free outlet cross-sectional area when the plate 74 is in the closed position. The velocity of flow through the nozzle 87 is small, and therefore the loss of pressure in the nozzle is also small. In the space between the nozzle and the small plate 74, that is to say, at the working cylinder 90, there prevails a pressure which is only slightly below the maximum pressure. The stress in the spring 92 is so dimensioned that in this position the same is fully compressed (Figure 15).

The other case occurs when the electro-magnetic excitation is a maximum, and therefore the spring 73 vibrates with maximum amplitude. According to Figure 13 the maximum outlet mean value is then attained. The outlet aperture on the slide valve is so dimensioned that the mean time value of the slide-valve aperture is for example about three times as great as the aperture of the nozzle 87. The consequence of this is that the pressure drop of the nozzle 87 is approximately equivalent to the gauge pressure in the compressed air reservoir 85, that is to say, the pressure at the working cylinder 90 is very small.

The spring 92 will therefore press the piston 91 into its inner end position, and will expel the air in the working cylinder 90 through the vibrating slide valve 74.

Between these two end positions the pressure in the working cylinder 90, and at the same time the position of the piston 91, depend upon the instantaneous amplitude of vibration of the resonator. Every intermediate position (for instance an intermediate rudder deflection) can therefore be adjusted accurately and evenly, that is to say, the adjustment does not proceed step by step.

The quantity of air escaping at the orifice 80 fluctuates at twice the frequency of the resonator. These fluctuations result in changes of pressure at the working cylinder 90. A comparison of the quantity escaping in one period with the volume of compressed air in the cylinder 90 and in the inlet pipe shows that these periodical fluctuations of pressure, and the changes occasioned thereby in the position of the piston 91, can only be exceedingly small. For the rest, these vibrations are very desirable, because the troublesome difference between static friction and sliding friction is thereby eliminated. The piston 91 therefore reacts to very fine movements of the control member 1.

The electro-pneumatic resonance relay shown in Figures 17 to 20 has eight resonators. It can therefore be used for example for four symmetrical flight control movements with double-cylinder drive, or for three symmetrical rudder movements with double-cylinder drive and two unsymmetrical flight control movements with unilateral drive.

Upon a frame consisting of light metal or of material moulded under pressure, shown in Figures 17 to 20, the resonators are arranged in groups of four resonators each. The resonators are tuned to vibrate at the required frequencies by limiting the length of the springs that is free to vibrate by using clamping pieces 84 of different lengths. The springs 73 are accurately guided laterally.

Since in order to reduce the ohmic losses the length of the windings of the exciter coils 77 has to be as small as possible, the resonators 73 and the air conduit 81 are grouped in the manner shown in Figures 17 to 20. The central air conduit has two orifices 80, that is to say, it serves two resonators 73.

The compressed-air inlet conduit 86 conveys air to the transverse conduits 93, shown in Figure 23, which communicate with the conduits 81, each of which has an outlet orifice 80. The admission of air to the conduits 81 and the orifices 80 is adjusted by means of grub screws 94, which close the ends of the conduits 93.

The shape of the slide valve apertures is the deciding factor for the maximum travel of the slide valve in any particular instance.

The amplitude of vibration, from the mid position to the complete uncovering of the slide-valve aperture on both sides, is to be as small as possible. This involves a great extension in the vertical direction and a correspondingly small extension in the transverse direction. Assuming that the slide valve is rectangular the most advantageous slide-valve aperture is obtained when with maximum deflection of the resonator the boundary edge of the slide valves coincides with the edge of the aperture. In Figures 14a, 14b and 14c, three slide-valves of different shapes but of the same area are shown. Of these, a trapezium standing on end, as shown in Figure 14c, yields the minimum slide-valve travel. The slide-valve aperture should also exhibit as advantageous a ratio as possible between the length of the boundary edge and the cross-sectional area of the aperture, since, as mentioned above, the consumption of air with the slide valve fully closed is proportional to the product of the length of the boundary edge and the distance of the slide valve. The most advantageous ratio between area and periphery, as is known, is given by the circle, as shown in Figure 14b. This form however is disadvantageous with respect to the maximum amplitude of vibration. The distance between the slide valve 74 and the orifice 80 is to be made as small as possible without contact occurring. The plane of vibration of the slide valve 74 must be exactly parallel to the plane of the orifice.

In order to obtain a high magnetic efficiency, the resonator 73 is made in two parts. The spring 73 is made of spring steel or phosphor bronze. For the armature, core sheet or "permalloy" is employed. The two members may be connected with one another by riveting or soldering. The upper end of the armature is slotted or split, and the two portions are bent at right angles in opposite directions, as shown in Figures 21a, 21b, 21c, 21d. The two exciter coils 77 are each secured by the aid of a wedge-piece 113 (Figs. 19 and 24a, 24b) to the central branch of the manifold. According as the output connection of the receiver is symmetrical or unsymmetrical, the coils 77 are or are not equipped with a central tapping. It is advisable to shut off the direct-current component of the anode circuit of the output discharge tube which energizes the coil by means of a transformer or similar direct-current blocking arrangement. The impedance of the coils should be matched to the impedance of the output discharge tube, or to the impedance of the transmission line interconnecting the output discharge tube and the coils.

On the base plate are provided, on a central support 102, two bar magnets 114 (Fig. 17), consisting of an aluminium-nickel alloy. Inner and outer pole shoes 115 of soft iron are securely bolted to the magnets 114 and supported in holder pieces 116, shown in Figs. 22a, 22b.

To concentrate the magnetic flux, and to save weight, the pole shoes 115 are split or slotted in such a way that the effective ends face one another only over the breadth of the resonator armatures 71.

In the form of construction of the electro-pneumatic resonance relay shown in Figures 25 and 26, each resonator consisting of a blade spring 124 and an armature 125 is attached to a slide valve 126. The resonators are clamped by means of clamping pieces 127 of different lengths. Figure 26 shows an enlargement of the armature 125, the pole shoes 120, 122 and the slide valve 126. The manifold 128 (see also Figure 27) is connected by two holders 129 with the magnet system. A manifold of this construction is illustrated in Figure 29. Nozzles 201 are inserted in a brass tube 200. Air enters the nozzle through a lateral aperture 203. By the aid of a conically ground grub screw 204 the quantity of air can be adjusted when adjusting the plant. To the pipe-coupling members 205 are attached the control cylinders or the servo-valves, as the case may be. The lower end of each nozzle is shut off by a small plate 206. The air outlet orifice 207 is provided with a milled surface 208 (Figures 26 to 28) in front of which swings the slide valve 126, as shown in Figures 25 and 26.

*(4) The working cylinders for driving the controlled elements.*—The action of the working cylinders was indicated when explaining the electro-pneumatic resonance relay for an unsymmetrical control movement without a servo-drive (Fig. 15). The movement of the piston in the working cylinder is thus the result of the steady state of equilibrium between cylinder pressure and spring pressure plus control pressure. When the cylinder pressure is variable owing to the action of the electro-pneumatic resonance relay, the spring, in order to adapt itself to the existing pressure conditions, must always vary its length, which is equivalent to a different position of the piston, and therefore of the rudder or similar member being controlled.

It would be possible, with the single-acting appliance previously described, to actuate a control with a central zero position and symmetrical control abutments. The frequency or the amplitude for the zero position must then be so far removed from the resonance frequency that half the maximum amplitude of the resonator is retained. An equilibrium of pressure is then attained, which corresponds to the zero position of the control. Such a state of equilibrium is very unstable. For the zero position of the rudder and of the control member to coincide with one another would only be possible with constant transmission and reception conditions. Since however the distance between the transmitter and the receiver is continually altering, the conditions necessary for such coincidence are difficult to attain, but they may be attained approximately, either by means of a very efficient gain control in the receiver, or by varying the power of the transmitter in dependence upon the distance. Both expedients may be employed concurrently.

For all the controlling operations with central zero position and symmetrical control abutments, resonators are normally employed in electro-pneumatic resonance relays.

For the rudder-drive a double-acting differential cylinder, as illustrated for example in Figures 31 and 32 may be used. Assume frequency control. In the zero position the control frequency is at the common base point between the two resonance curves (Fig. 5). The resonators 73 are at rest. The escape of air at the two orifices 80 is a minimum, and the pressure in the two cylinders (only one of which, i. e., cylinder 39' is visible in Fig. 23) is equal and a maximum. Since the two piston forces act in opposite directions, there is no resultant force component, and the rudder 144 is held in the zero position (Figure 33) by the symmetrically acting antagonistic springs 146. Fluctuations of field strength, and disturbances or interruptions in the wireless transmission, do not therefore affect this rudder position.

When the transmitting member is moved out of the zero position, that resonator 73 is set in oscillation for which an approximation to the resonance frequency has taken place, the amplitude of vibration corresponding to the degree of approximation. The vibrating resonator 73 increases the escape of air. A proportional fall of pressure accordingly occurs in the associated working cylinder 139 (Figure 33).

The pressure in the co-acting cylinder 139' Figs. 31 and 32, which has remained unchanged at the maximum value, predominates. The rudder 144 deflects in the direction of the cylinder 139 with the variable fall of pressure, a state of equilibrium being reached between the pressure difference in the two co-operating cylinders on the one hand and the restoring forces on the other hand. If the transmitter member 1 is displaced out of the zero position in the opposite direction, the two resonators 73 are interchanged in their operation, and likewise the two working cylinders 139 and 139', and the rudder is deflected in the other direction.

For an operating pressure, used in the electropneumatic resonance relay, of about one-tenth of an atmosphere by gauge, the known designs of pressure cylinders are not satisfactory, because the frictional losses form too large a percentage of the forces usefully employed, and because the magnitude of the friction is dependent upon various external influences, such as temperature, or viscosity, of the oil used. A control cylinder in which the piston friction is reduced to a minimum is shown in Figures 31 and 32.

The inner cylinder 135 constituting the working position is guided co-axially in two outer cylinders 139 and 139', by guiding rods 137, connected with one another by means of cross bars 136, and bearings 138. Compression springs 140 hold the movable cylinder in its mid position. In the space between the outer and inner cylinders is placed an indiarubber bag 141. When the pistons 135 move in the cylinders 139 and 139', the indiarubber sheaths 141, which are filled with air, roll, as it were, along the peripheral surfaces of the two cylinders, and air is expelled through pipes 142.

For the positive actuation of a plurality of members the double cylinders described above may be employed as shown in Fig. 38. The control surfaces S are connected by tensile members 220 with the cross bars 136 as shown in Figure 38. For tail-control (elevating and lateral rudders) of model aeroplanes, the control cylinders 139 and 139' may be lodged in the shell or covering of the tail 144, as shown in Figure 33. In order that there may be as few projecting parts as possible, the cylinders are in staggered relationship to the axis of rotation.

By the aid of a receiving set, which is fed directly from the electro-pneumatic resonance relay, an effective operating pressure of about 0.2 kilogramme can easily be obtained.

If it is a question of controlling movable objects calling for a large expenditure of force, a pneumatic, hydraulic or electrical servo-device is employed.

In the case of a pneumatic servo-drive, a single-acting or double-acting system may be constructed. With the single-acting type of structure, the piston pressure on the one hand, and the pressure of a powerful antagonistic spring plus the back pressure of the rudder on the other hand, counter-balance one another. Figures 34 to 36 show a compressed-air servo-drive. A double-armed lever 150 is mounted upon a hollow shaft 151, which is ground into and readily rotatable in a bush 152. The bush 152 is rotatably supported in a valve casing 153. The rotating of the bush 152 is effected by way of rod-and-lever mechanism 154, in positive connection with the movement of the working piston 155. The transmission of power to the rudder 144 is effected by way of a connecting rod 157.

Compressed air at a gauge pressure of about 10 atmospheres passes through an inlet pipe 158 into a circumferential groove 159 in the hollow shaft 151, and into axial grooves or ports 160 in the periphery of said shaft. The bush 152 is provided with slots 161 which are adapted to register with the ports 160 or with radial slots 162 in the shaft 151, which are in open communication with the axial bore 163 of the shaft and through the latter with the atmosphere.

Assuming that the control cylinder occasions a right-handed rotation of the hollow shaft 151, from the position shown in Fig. 34 until the ports 160 register with the slots 161 in the rotatable bush 152, compressed air from the pipe 158 flows through the ports 160 and slots 161 into the turned recess of the casing 153, and from there into the working cylinder 155a through a pipe 153a. The piston 155 moves outwards to the right under the action of the compressed air. The bush 151 rotates, in consequence of the motion imparted thereto by the piston 155 through the rod 154, in the same direction as the hollow shaft 151, until the slots 161 are covered by portions of the periphery of the shaft 151 located between the grooves 160 and the slots 162, whereby the flow of compressed air through the slots 161 is interrupted and the piston comes to rest. If the hollow shaft 151 rotates to the left, the slots 162 are brought into register with the slots 161 of the bush 152, so that the compressed air contained in the cylinder 135 can pass into the axial bore 163, and from there into the atmosphere. It is evident that the working piston continues to move until the position of the bush 152 relatively to the hollow shaft 151 is the same as that shown in Figure 34 in which the slots 161 are covered.

The regulating member for a double-acting servo-cylinder is illustrated in Figure 36. The construction is substantially the same as for a single-acting cylinder, but the compressed-air paths are modified, that is to say, the distribution of the fresh-air grooves and exhaust slots in the hollow shaft 161 is different from that of Figure 34. The pressure manifold in the casing 175 is here in two parts, one part communicating with the upper pressure chamber of the cylinder and the other part with the lower one.

Figure 37 shows a type of servo-motor differing from the type already described.

The pipe 185 is connected to the electro-pneumatic resonance relay, the pipe 186 with the working cylinder, and the pipe 187 to the air-pump. An india rubber diaphragm 188 separates the pressure space of the electro-pneumatic resonance relay from that of the working cylinder. When the pressures are in equilibrium the diaphragm occupies its mid position. A rotary or cylindrical valve 189 is connected by a steel wire 190, in which a helical spring 191 is inserted, with the diaphragm. A row of holes 192, in the initial position, faces a web or bridge-piece 193 between turned grooves 194 and 195, of which the former communicates with the atmosphere and the latter with the pump. When a difference of pressure occurs between the two spaces separated by the diaphragm 188, the cylindrical slide valve 189, according to the sign of the difference, moves into the region of one of the two grooves 194, 195 until equilibrium of pressure is re-established.

The purpose of this form of the apparatus is to enable the pressure in the two working cylinders to be equalised with as little delay as possible, since the cross-sectional areas provided in the servo-valve can be made considerably larger than those of the electro-pneumatic resonance relay.

By the aid of the spring 191 introduced into the mechanical connection 190, a change in the magnitude of the pressure can also be obtained. The diaphragm 188 on the one hand and the circular slide valve 189 on the other hand act as a differential piston. With an increase of the pressure prevailing in the working cylinder the spring 191 lengthens, so that a greater deformation of the diaphragm 188 is necessary, in order to obtain the same position of the slide valve, than with a low pressure. This action can be further increased by enlarging the cross-sectional area of the round slide valve 189, or by providing a correspondingly large counter-pressure diaphragm.

Instead of a pneumatic or hydraulic servo-control, an electrical or electro-mechanical servo-device may of course be used. For the appropriate arrangement and wiring there are numerous known examples. One type of construction will be here described in detail.

Referring to Fig. 39, the reversible electric motor 215 has an arrangement of the connections with a mid-point feed, the drive being applied to a control shaft 216 through a worm 217 and worm-wheel segment 218. An insulated blade spring 219 secured to the segment 218 has at its free end a contact piece which is arranged between co-acting contacts 221 and 222, secured in the insulating piece 220. This insulating piece 220 is connected with a double-acting piston 223, which is a constituent part of an electro-pneumatic regulating system.

When the piston moves in one direction out of the position of rest, one of the contacts 221, 222 will touch the central contact, and will remain in contact with it until the motor has shifted the segment so far in the same direction that the position of the segment corresponds to the new position of the piston.

*Automatic regulation of the control-signal.*—When adopting the method of regulating the resonator amplitude on the principle of the half resonator curve, it is desirable to keep the strength of the low frequency control signal that flows through the exciter coil of the relay at a constant level. For the method of controlling the resonators by variable amplitudes of constant control frequency, however, an exact regulation of the signal strength level is an indispensable prerequisite. In wireless transmission of the control signal by the use of a high-frequency carrier wave between two movable objects, or between a stationary and a moving object, it lies in the nature of the case that in consequence of the inevitable changes of distance, great fluctuations of field strength occur at the receiving aerial. Furthermore it is known that the useful field strength at the receiving aerial is also a function of the relative positions in space of the transmitting and receiving aerials. Both causes involve the necessity of adopting an automatic regulation of the signal strength level having a great useful range. One condition essential for the attainment of the desired range of regulation is a sufficient transmitter power output, and another is a sufficient maximum sensitiveness of the receiver. The critical limiting values are bound up with the condition that even in the case of disadvantageous transmission conditions the control voltage required for the method of working of the electro-pneumatic resonance relay is available at the receiver output.

The following methods of automatic regulation of the signal strength level are suggested, the specific features of which prove more or less advantageous according to the particular purpose for which the distant control is employed.

(1) For those purposes in which it is a question of discharging, from an aeroplane for example, a projectile equipped with a tele-steering device, and in which the problem is to steer this projectile to a definite target by the aid of the tele-steering apparatus, a definite relationship has to be established in every case between the time of discharge and the distance between the transmitter and the receiver. Moreover in the given examples the spreading or diffusion conditions of electro-magnetic waves are very close to the physical ideal case without taking disturbing damping effects into consideration. These are advantageous presumptions for the adoption of automatic control of the signal strength level operated from the transmitter, employing mechanical means. The designs adopted for embodying this principle may for example be provided in the following manner:

By actuating the starting appliance for the projectile to be steered, a clockwork mechanism or a small electric motor is set in operation by a mechanical or electrical coupling, and by this means an eccentric sheave or disc is set in slow rotation, one revolution having the duration of the longest trajectories to be considered. A roller pressed against the eccentric sheave by a spring varies its distance from the axis of the eccentric sheave or disc in the course of the trajectory as a function with which the transmitting energy in the course of the discharge is to be increased in order to obtain a more or less constant high-frequency voltage at the receiving aerial of the projectile. The movement of the running roller is coupled, by the aid of a rod-and-lever transmission mechanism, to the continuously acting power-output regulator of the transmitter. After the expiration of a discharge the appliance can be restored, either by hand or automatically to the' position of readiness.

(2) For all applications of the control described in which the distance and the relative position in space of the receiving aerial in relation to the transmitting aerial are variable arbitrarily and irregularly within wide limits, the signal strength level regulation is preferably effected on the receiver side. In principle any one of the numerous arrangements for counteracting fading, such as are employed in broadcasting receivers, may be adopted. Since the mixture of frequencies to be transmitted differs in its structure from that of normal electro-acoustical transmissions, methods of regulation of the signal strength level may be adopted which are considerably more effective than those of the ordinary fading-compensation means, in which, as is known, the regulation voltage is obtained from one or more diode sections of the demodulator stage.

With the exclusive employment of frequency regulation by the method of the half resonance curve, the effective value of the mixture of alternating control voltages is independent of the adjustment of the individual control frequencies. It is therefore possible to utilise the effective value of this voltage in the anode circuit of the output amplifying valve as a regulating component for the automatic regulation of the signal strength level instead of a voltage derived from the demodulating stage. In this way the regulating impulse for a fluctuation, occurring at the input, is considerably stronger than with the normal method, because the whole of the amplification of the receiver is inserted in between. Preferably the method of delay regulation is adopted, in order to obtain an advantageous shape of the curve of regulation.

This arrangement may be carried out according to the principle of connection illustrated in Figure 40. 301 and 302 are valves which are to be regulated by varying the grid bias. 303 is the output valve, the anode circuit of which includes the exciter winding 304 of the electro-pneumatic resonance relay. The alternating anode voltage is taken directly from this winding and supplied in a known manner, by way of a condenser 305, to a rectifier or diode 306. The direct voltage across the resistance 307 generated by rectifying the alternating voltage serves as a regulating voltage. It is supplied as a negative grid bias to the grids of the valves 301 and 302 to be regulated through a filter circuit consisting of a resistance 308 and a condenser 309. The rectifier section 306 may be connected to a tapping on the anode battery 310 to thereby provide a voltage delay in the action of the bias regulating voltage.

In controlling the resonators by amplitude variation of the control frequencies, and for mixed frequency and amplitude control, the potential of the control voltage at the relay is a function of the position of the regulating members, that is to say, the control voltage is variable with constant transmission conditions. In order nevertheless to be able to utilise the advantages of the maximum amplified controlling voltage, a special alternating voltage of constant frequency and amplitude, serving only for the regulation of the signal strength level, is preferably superposed upon the control signal at the transmitter end. At the receiver end, in series or in parallel with the relay winding, an oscillating circuit 311 is coupled to the anode circuit of the end valve 303, as shown in Figure 41, and is tuned to the regulating frequency. The alternating voltage of this circuit is supplied, just as described above, to a rectifier 306, and the direct voltage thus obtained, with or without a delay voltage, is applied to the grids 301a and 302a of the valves to be regulated. The remaining circuit components constituting the receiver VI and the position and functioning of the valves 301, 302 and 303 are well understood by those skilled in the art and a further description thereof is believed to be unnecessary.

A further method of regulating the signal strength level, shown in Fig. 42, likewise uses an auxiliary signal serving exclusively for regulating purposes. Instead of an electrical oscillating circuit, electro-pneumatic control means are employed, including an additional mechanical resonator 312 mounted in the electro-pneumatic resonance relay, the said resonator being set in vibration by the auxiliary signal from the transmitter comprising an alternating current of constant frequency and amplitude, superposed on the signals for adjusting the control members of the tele-controlled object. The amplitude is therefore still only a function of the transmitting conditions. The variation of the input strength of the auxiliary signal at the receiver acts on the supplementary resonator 312 which controls the air flow through an orifice 318 in a conduit connected to a pneumatic cylinder 313, so as to produce pressure variations in the latter in a similar manner to the pressure variations produced by the other resonators in the bodies of air which affect the adjustment of the control members of the tele-controlled object. The cylinder 313 has a piston or like member which is in a position of equilibrium between the force of an antagonistic spring (not shown) and the pressure in the cylinder. This piston member, which in the arrangement shown in Figure 42 comprises a diaphragm 314, is connected with the movable yoke of an iron core transformer 319 interposed between the receiver and the exciter coil 317 of the resonator 312 in such a way that one or more air gaps 316 of the transformer yoke become larger or smaller when the member 314 is displaced by pressure variations in the cylinder 313, whereby the magnetic circuit of the transformer 319, through which the mixture of alternating currents is supplied to the electro-pneumatic resonance relay, varies as a function of the pressure in the cylinder 313. Since the pressure in the cylinder 313 depends on the input strength of the auxiliary signal at the receiver acting on the exciter coil 317 through the transformer 319, the strength of the mixture of alternating control voltages supplied to the electro-pneumatic resonance relay through the transformer is held at an approximately constant level.

Alternatively, the piston member may be connected with the sliding contact of a potentiometer which is so connected that by varying the grid bias of the valves to be regulated a fall of the input signal strength leads to an increase in the amplification.

What I wish to claim and secure by U. S. Letters Patent is:

1. Apparatus for remotely controlling the position of an element in synchronism with the movement of a control member, comprising a source of alternating voltage, means to vary said voltage smoothly and proportionally to the change in the position of said control member, means to transmit the so varied voltage, an electrically operable vibratory member responsive to the said varied voltage the amplitude of the vibration of said member being variable in accordance with the variations of the voltage, a gas column having an inlet port and an outlet port, a source of gas under pressure connected to said inlet port, a valve movable relatively to said outlet port the valve being actuatable by said vibratory member and being adapted to vary the pressure of said gas column in a smooth and continuous manner and proportional to the amplitude of movement of said vibratory member, and means actuated by variations in the pressure of said gas column for controlling the position of said element.

2. Apparatus as claimed in claim 1, including as voltage varying means means for varying the frequency and the amplitude of the alternating voltage smoothly and proportionally to the movement of the control member.

3. Apparatus as claimed in claim 1 comprising in the means for varying the voltage a variable flux transformer coupled to the source of alternating voltage, and means connected with the control member for varying the flux of said transformer.

4. Apparatus as claimed in claim 1 wherein the valve actuable by the vibratory member is a plate-shaped element secured to the vibratory member and positioned over the outlet port to obstruct and free the same during the vibrations of said member.

5. Apparatus as claimed in claim 1 wherein the valve actuable by the vibratory member is movable in a plane parallel to and closely adjacent the plane of the outlet port in proportion to the displacement of the vibratory member.

6. Apparatus as claimed in claim 1 wherein the inlet port has an adjustable passage aperture, and comprising means to adjust said aperture to produce a substantially small pressure drop through the inlet port when the outlet port is obstructed by the valve and to produce a substantially large pressure drop through the inlet port when the outlet port is freed by the valve.

7. Apparatus as claimed in claim 1 comprising as means actuated by the variable pressure in the gas column a working cylinder connected to the gas column between the inlet and outlet ports, and means operable in accordance with pressure in the working cylinder for controlling the position of the element to be controlled.

8. Apparatus as claimed in claim 1 including in combination with the vibratory member responsive to the varied voltage a U-shaped armature secured to the vibratory member, a magnet having pole shoes which form an air gap with respect to which the armature is movable, and means for altering the strength of said magnet in accordance with the varied voltages.

9. Apparatus as claimed in claim 1 comprising a cylinder connected to the gas column, and as means actuated by the variable pressure in the gas column a piston within said cylinder and spaced therefrom, and a flexible gas-impervious envelope between the piston and cylinder connected at one end to the cylinder and at the other end to the piston, to form a pressure responsive chamber of variable volume between the cylinder and the piston and adapted to support the piston during relative movement of the cylinder and piston.

10. Apparatus as claimed in claim 1 wherein the means to transmit the varied voltage comprises a source of a high frequency carrier wave and a modulator for impressing the varied voltage on the carrier wave, including means for varying the intensity of the modulated carrier wave.

11. Apparatus as claimed in claim 1 wherein the means to transmit the varied voltage comprises a source of a high-frequency carrier wave, a modulator for impressing the varied voltage on the carrier wave, and means for intercepting the modulated carrier wave, the intercepting means comprising an amplifier, a demodulator for the carrier wave and means for varying the degree of amplification of the carrier wave proportional to the intensity of the demodulated voltage for producing a demodulated voltage of substantially constant amplitude.

12. Apparatus for remotely controlling the position of an element in synchronism with the movement of a control member, comprising two sources of alternating voltage, means for varying one of said voltages proportionately to the change in the position of said control member, a source of high frequency carrier wave, means for modulating said carrier wave in accordance with the varied voltage and the unvaried generated alternating voltages, means to transmit the so modulated carrier wave with the varied and unvaried voltages superimposed to each other and to said carrier wave, means to intercept the modulated carrier wave, an amplifier and a demodulator for the intercepted carrier wave deriving to obtain therefrom the unmodulated varied voltage and the non-varied transmitted alternating voltage, two electro-mechanical resonators each comprising a vibrating member responsive to one of the transmitted voltages, two gas columns having inlet and outlet ports, a source of gas connected to the inlet ports, two valve members each actuated by one of said vibratory members covering said outlet ports and adapted to vary the pressure of the gas columns in a smooth and continuous manner and proportional to the amplitude of movement of the vibratory members, means actuated by variations in the pressure of the gas column controlled by the varied voltage for controlling the position of said element, and means actuated by variations in the pressure of the gas column controlled by the non-varied transmitted voltages for varying the degree of amplification of the intercepted modulated carrier wave.

13. Apparatus as claimed in claim 12 wherein the means for varying the degree of amplification of the intercepted wave comprises a pressure cylinder actuated by the variations in pressure in the gas column controlled by the other of the transmitted voltages, a source of biasing voltage for said amplifier and a potentiometer actuated by said pressure cylinder for varying the amplitude of the biasing voltage.

14. Apparatus for controlling the movement of an element about a given position from a remote location in synchronism with the movement of a control member about a corresponding given position at said remote location, comprising two sources of alternating voltages of different frequencies and of given intensity at the remote location, means for selectively varying the intensity of said voltages smoothly and proportionately to the change in the position of the control member from the given position, means for transmitting the so varied voltages simultaneously over a common path and converting the transmitted voltages into two different groups of mechanical vibrations, each group having a resonant frequency different from the other and equal to the frequency of one of said voltages and each having an amplitude of displacement within the resonant range proportional to the amplitude of the exciting voltage, means for electropneumatically controlling the pressure of two columns of gas in a smooth and continuous manner each by means of one of said groups of vibrations and in proportion to the amplitude of movement of the same, and means for controlling the position of said element in a smooth and continuous manner by variations in the pressure of the gas columns.

15. Apparatus for remotely controlling the position of an element at a receiver movable relatively to a transmitter and in synchronism with the movement of a control member at the transmitter, comprising a source of alternating voltage at the transmitter, means for varying said voltage smoothly and proportionally to the change in the position of the control member at the transmitter, means for modulating the so varied voltage on a high frequency carrier wave, means for transmitting the modulated carrier wave and varying the intensity of the modulated carrier wave proportional to the distance between the transmitter and the receiver so as to maintain a constant field intensity at the receiver, means for intercepting and demodulating the transmitted carrier wave, means for electro-pneumatically controlling the pressure of a column of gas in a smooth and continuous manner proportional to the variations of the demodulated voltage, and means for controlling the position of said element in a smooth and continuous manner by variations in the pressure of the gas columns.

16. Apparatus for remotely controlling the movement of an element about a given position in synchronism with the movement of a control member about a corresponding given position, comprising a source of alternating voltage of given frequency, means for varying the frequency of said voltage about the given frequency smoothly and proportionally to the movement of the control member from the given position, means for modulating the so varied voltage on a high frequency carrier wave, means for transmitting, intercepting and amplifying the modulated carrier wave, means for demodulating the amplified carrier wave, means for varying the degree of amplification of the intercepted modulated wave inversely proportional to the amplitude of the demodulated voltage so as to produce a demodulated voltage of substantially constant amplitude, means for converting the demodulated voltage into a plurality of sets of mechanical vibrations, each set having a resonant frequency different from the frequency of the voltage generated at the given position of the control member and each set of vibrations being adapted to be graphically represented by a curve, the curves for all sets having a common foot point, means for electro-pneumatically controlling the pressure of individual columns of gas in a smooth and continuous manner in accordance with the mechanical vibrations and in proportion to the amplitude of movement of the same, and means for controlling the position of said element in a smooth and continuous manner by variations in the pressure of the gas columns.

17. Apparatus for remotely controlling the movement of an element about a given position in synchronism with the movement of a control member about a corresponding given position, comprising two sources of alternating voltages of different frequencies and of given intensity, means for selectively varying the intensity of one of said voltages smoothly and proportionally to the change in the position of the control member from the given position, a third source of alternating voltage of another frequency and of constant amplitude, means for modulating the three voltages on a high frequency carrier wave with the three voltages superimposed thereon, means for transmitting the modulated carrier wave, means for intercepting and amplifying the modulated carrier wave, means for demodulating the said carrier wave, means for separating the said third voltage from the other demodulated voltages, means for varying the degree of amplification of the intercepted modulated wave inversely proportional to the amplitude of said separated voltage, means for converting the other demodulated voltages into two groups of mechanical vibrations, each group having a resonant frequency different in value and equal to the frequency of one of said voltages and each having an amplitude of displacement within the resonant range proportional to the amplitude of the exciting voltage, means for electro-pneumatically controlling the pressure of two columns of gas in a smooth and continuous manner, each in accordance with a group of said vibrations and in proportion to the amplitude of movement of the same, and means for controlling the position of said element in a smooth and continuous manner by variations in the pressure of the gas columns.

18. Apparatus as claimed in claim 17, including means for varying the pressure of a third body of gas by means of said separated voltage and varying the degree of amplification of the intercepted modulated wave in proportion to the variation in the pressure of said body of gas.

OSKAR STETTLER.